(12) United States Patent
Nowastowski-Stock

(10) Patent No.: US 10,574,048 B2
(45) Date of Patent: Feb. 25, 2020

(54) CABLE WALL PASSTHROUGH AND KIT

(71) Applicant: CONTA-CLIP VERBINDUNGSTECHNIK GMBH, Hövelhof (DE)

(72) Inventor: Jörg Nowastowski-Stock, Detmold (DE)

(73) Assignee: Conta-Clip Verbindungstechnik GMBH (DE)

( * ) Notice: Subject to any disclaimer, the term of this patent is extended or adjusted under 35 U.S.C. 154(b) by 0 days.

(21) Appl. No.: 16/314,087

(22) PCT Filed: Jun. 30, 2017

(86) PCT No.: PCT/DE2017/100551
§ 371 (c)(1),
(2) Date: Dec. 28, 2018

(87) PCT Pub. No.: WO2018/001419
PCT Pub. Date: Jan. 4, 2018

(65) Prior Publication Data
US 2019/0326739 A1    Oct. 24, 2019

(30) Foreign Application Priority Data
Jun. 30, 2016   (DE) .................. 20 2016 103 494 U

(51) Int. Cl.
*H02G 3/22*   (2006.01)
*H02G 3/04*   (2006.01)

(52) U.S. Cl.
CPC ............ *H02G 3/22* (2013.01); *H02G 3/0406* (2013.01)

(58) Field of Classification Search
USPC ....................................................... 138/106
See application file for complete search history.

(56) References Cited

U.S. PATENT DOCUMENTS 1,133,976 A * 3/1915 Kraus .................. F16L 3/2235
248/68.1
3,489,440 A * 1/1970 Nils ...................... F16L 3/2235
403/192
(Continued)

FOREIGN PATENT DOCUMENTS

CN    1914777 A    2/2007
CN    1918763 A    2/2007
(Continued)

OTHER PUBLICATIONS

International Search Report (in English and German) and Written Opinion (in German) issued in PCT/DE2017/100551, dated Sep. 21, 2017; ISA/EP.

(Continued)

*Primary Examiner* — William H. Mayo, III
*Assistant Examiner* — Krystal Robinson
(74) *Attorney, Agent, or Firm* — Harness Dickey

(57) ABSTRACT

The invention relates to a wall duct for cables, comprising a housing component which can be mounted on a housing wall in the region of a wall opening and has a recess for guiding cables through the housing component; separators which are integrally formed on the housing component and with which multiple openings separated by the separators are formed in the recess, wherein the openings are configured to accommodate one or more respective sealing elements, with which a cable duct for at least one of the cables is produced; and a closure component which closes at least one of the openings and is arranged on the housing component and/or the separators by means of one or more target breaking points. The invention also relates to an assembly for a wall duct for cables.

13 Claims, 12 Drawing Sheets

(56) References Cited

U.S. PATENT DOCUMENTS

| | | | | |
|---|---|---|---|---|
| 3,693,664 | A * | 9/1972 | Schmunk | F16L 9/18 138/111 |
| 3,731,448 | A * | 5/1973 | Leo | H02G 9/10 52/592.1 |
| 3,820,828 | A * | 6/1974 | Fiddler | F16L 39/00 285/124.3 |
| 3,976,825 | A * | 8/1976 | Anderberg | H02G 3/22 174/151 |
| 4,036,289 | A * | 7/1977 | Cheng | F28F 9/0132 165/82 |
| 4,249,353 | A * | 2/1981 | Berry | F16L 5/04 52/232 |
| 4,291,195 | A * | 9/1981 | Blomqvist | H02G 3/22 174/505 |
| 4,376,230 | A * | 3/1983 | Bargsten | H02G 3/22 174/505 |
| 4,656,313 | A * | 4/1987 | Moore | H05K 9/0018 174/362 |
| 4,702,444 | A * | 10/1987 | Beele | H02G 3/22 174/151 |
| 4,764,422 | A * | 8/1988 | Hill | H01B 1/22 428/309.9 |
| 4,889,298 | A * | 12/1989 | Hauff | F16L 5/08 248/56 |
| 4,901,956 | A * | 2/1990 | Jacobsen | H02G 3/22 174/481 |
| 4,919,372 | A * | 4/1990 | Twist | F16L 5/08 174/156 |
| 5,067,676 | A * | 11/1991 | Beele | F16L 5/04 248/56 |
| 5,123,862 | A * | 6/1992 | Suzuki | H01R 13/5202 439/533 |
| 5,234,358 | A * | 8/1993 | Polgar | H01R 13/506 439/465 |
| 5,326,931 | A * | 7/1994 | Cain | H02G 3/123 174/503 |
| 5,328,388 | A * | 7/1994 | Fust | H01R 13/514 439/364 |
| 5,493,068 | A * | 2/1996 | Klein | H02G 3/22 174/151 |
| 7,490,630 | B2 * | 2/2009 | Coupe | E02B 11/005 138/106 |
| 7,806,374 | B1 | 10/2010 | Ehmann et al. | |
| 8,006,447 | B2 * | 8/2011 | Beele | A62C 2/065 52/232 |
| 8,266,782 | B2 * | 9/2012 | Miyazaki | B21D 39/06 138/106 |
| 8,342,474 | B2 * | 1/2013 | Gilbreath | F16L 3/222 165/162 |
| 8,541,698 | B2 * | 9/2013 | Perschon | H02B 1/305 174/152 G |
| 8,963,010 | B2 * | 2/2015 | Sprenger | H02G 3/083 174/151 |
| 9,496,692 | B2 * | 11/2016 | Sprenger | H02G 3/083 |
| 9,722,404 | B2 * | 8/2017 | Beele | H02G 3/22 |
| 10,371,182 | B2 * | 8/2019 | Milton | F16L 5/08 |
| 2001/0037835 | A1 * | 11/2001 | Shimizu | F16L 5/04 138/106 |
| 2004/0093815 | A1 * | 5/2004 | Cordts | H02G 3/0412 52/232 |
| 2004/0231880 | A1 * | 11/2004 | Beele | A62C 3/16 174/668 |
| 2005/0115733 | A1 * | 6/2005 | Kreutz | F16L 5/14 174/652 |
| 2005/0179214 | A1 * | 8/2005 | Beele | F16L 5/04 277/628 |
| 2006/0272243 | A1 * | 12/2006 | Carew | E04G 15/061 52/220.1 |
| 2007/0169963 | A1 * | 7/2007 | Beele | F16L 5/04 174/650 |
| 2007/0184701 | A1 * | 8/2007 | Yagome | H01R 13/506 439/271 |
| 2009/0218451 | A1 * | 9/2009 | Lundborg | F16L 5/02 248/56 |
| 2009/0242230 | A1 * | 10/2009 | Hebert | H02G 3/14 174/67 |
| 2010/0187371 | A1 * | 7/2010 | Milton | H02G 3/22 248/74.1 |
| 2010/0326724 | A1 * | 12/2010 | Karlsson | F16L 5/08 174/652 |
| 2011/0088917 | A1 * | 4/2011 | Lee | A62C 2/06 169/45 |
| 2011/0094768 | A1 * | 4/2011 | Davis | A61N 1/3754 174/59 |
| 2012/0018959 | A1 * | 1/2012 | Andersson | F16L 5/08 277/607 |
| 2013/0106060 | A1 * | 5/2013 | Beele | F16L 5/10 277/314 |
| 2013/0228657 | A1 * | 9/2013 | Sprenger | H02G 3/083 248/56 |
| 2014/0042712 | A1 * | 2/2014 | O'Connor | H02G 3/02 277/606 |
| 2014/0144694 | A1 * | 5/2014 | Shah | A61N 1/3754 174/650 |
| 2015/0285408 | A1 * | 10/2015 | Cox | F16L 5/14 277/628 |
| 2018/0031396 | A1 * | 2/2018 | Bohlin | G06Q 50/06 |
| 2018/0301883 | A1 | 10/2018 | Nowastowski-Stock | |
| 2019/0123540 | A1 * | 4/2019 | Nakamura | H01M 2/10 |

FOREIGN PATENT DOCUMENTS

| | | |
|---|---|---|
| CN | 101154798 A | 4/2008 |
| CN | 101944712 A | 1/2011 |
| CN | 204167833 U | 2/2015 |
| CN | 104641524 A | 5/2015 |
| DE | 3224977 A1 | 1/1984 |
| DE | 4340343 C1 | 3/1995 |
| DE | 10225046 A1 | 4/2003 |
| DE | 202004006065 U1 | 7/2004 |
| DE | 102007060100 A1 | 6/2009 |
| DE | 102013201149 A1 | 7/2014 |
| DE | 202015102280 U1 | 5/2016 |
| EP | 1236256 B1 | 7/2003 |
| EP | 1363376 A1 | 11/2003 |
| EP | 1744425 A1 | 1/2007 |
| EP | 1892448 A1 * | 2/2008 ............... F16L 5/10 |
| EP | 2106006 A2 | 9/2009 |

OTHER PUBLICATIONS

Chinese Office Action (w/English translation) dated Dec. 20, 2019 in corresponding Chinese Application No. 201780040278.3.

* cited by examiner

CABLE WALL PASSTHROUGH AND KIT

CROSS-REFERENCE TO RELATED APPLICATIONS

This application is a 371 U.S. National Stage of International Application No. PCT/DE2017/100551, filed on Jun. 30, 2017, which claims the benefit of German Application No. 20 2016 103 494.9, filed on Jun. 30, 2016. The entire disclosures of the above applications are incorporated herein by reference.

FIELD

The invention relates to a cable wall passthrough and a kit for a wall passthrough of cables.

BACKGROUND

This section provides background information related to the present disclosure which is not necessarily prior art.

Wall passthroughs for cables, which can also be referred to as cable passthrough, are used to route cables from one side to the other through a wall. Such wall passthrough find particular application in connection with the passage of cables through a housing wall of a device or cabinet, for example, a control cabinet. Such wall passthroughs can provide a seal, for example, for sealing against the ingress of moisture and dirt.

Wall passthroughs can have a housing made of plastic, which is produced as an injection-molded component. In this or other known embodiments, the housing has a housing opening, which is arranged opposite a wall opening through which the cables are to be guided.

A cable passthrough or bushing accommodated by an incision of a wall for the tight passage of a cable or cable set through a wall in motor vehicles is known from document DE 32 24 977 A1. The cable bushing has a perforated base body with integrally adjoining truncated cone-shaped extension, whose end-side sealing member is sealingly supported on the cable. The base body is regularly quadrangular, for example, square. The cable bushing has outer narrow surfaces whose regions associated with the incision are held via tongue and groove connections. The incision receives several such cable bushings whose adjacent narrow surfaces also mesh with one another via tongue and groove joints. Thus, for example, the base body has recessed grooves in the respective narrow surface in the region of two outer boundary edges which are approximately parallel to one another and in a third approximately rectangular boundary edge connecting both. In the region of the fourth boundary edge, the base body carries an outwardly projecting tongue, which engages a plurality of cable bushings joining one another in a groove of an adjacent cable bushing.

Document DE 102 25 046 A1 relates to a device for connecting a cable bushing having a wall opening. The device surrounds the wall opening on all sides and can be connected to the wall tight and stationary. The device has at least one through opening for cables and can be fixed to the cable bushing and tightly connected. At least one locking body is provided to be able to connect the cable bushing with the device releasably.

Document DE 10 2013 201 149 A1 discloses a cable bushing device which has a seal carrier which has a cable bushing opening for the arrangement of a cable seal. The seal carrier and the cable seal have a separating plane extending parallel to a cable bushing direction, wherein a screwing element is provided, which can be screwed to the seal carrier for the installation of the cable seal against a cable arranged in the cable bushing opening.

A device for carrying through a plurality of lines is known from the document DE 20 2004 006 065 U1, in particular a cable bundle through a vapor/airtight and/or fire-proof layer.

A cable bushing is disclosed in document EP 1 236 256 B1. The document DE 10 2007 060 100 A1 describes another device for guiding through cables.

A cable bushing for a housing wall, in particular a wall or ceiling of a distribution cabinet or meter box, is disclosed in document EP 1 363 376 A1.

From the document EP 2 106 006 A2, a cable feed through for a housing wall is known which is produced from an insulating material, preferably plastic, in the form of a flat supporting plate with at least one marked area provided as a predetermined breaking point and serving as and when required as a cable passage and which is provided at its outer border with a peripheral sealing flange, which can be placed and fixed against a recess provided for this in a wall or intermediate wall, top or bottom of a distribution cabinet, a distribution box or a meter mounting board or the like, wherein each marked area is assigned a device for strain relief.

The document DE 20 2015 102 280 U1 discloses an arrangement with a wall lead-through for a plurality of cables as well as a kit. The arrangement comprises the following: a wall with a wall breakthrough, a housing of a wall lead-through which is arranged on one side of the wall in such a way that a housing breakthrough formed on the housing is located opposite to the wall breakthrough, and a plurality of cables that each run through the wall breakthrough and the housing breakthrough as well as a an assigned sealing element which is arranged around the respective cable in a sealing manner within a holding space of the housing, wherein, in the holding space of the housing, with the help of at least one grid component inserted, after the arranging of the housing on the wall, from an opposite side of the wall through the wall breakthrough into the holding space and, there, into the area of the housing breakthrough, separated receiving means are provided for one or a plurality of sealing elements each, in which the sealing elements are arranged.

The document EP 1 744 425 A1 discloses a cable feed through for a housing wall, in particular a wall of a meter and/or distribution cabinet, separable from the housing wall with a formation of a feed through opening through a section transverse to a normal at the level of the housing wall. The bulge has a material in a ring area that is provided for the section, which material is softer than at least the material externally adjacent to the ring area. Preferably, the bulge comprises a plurality of ring areas with a softer material, optionally usable for a sectioning in different manner for the formation of feed through openings.

In the document DE 43 40 343 C1, a method for the production of cable bushings through ceilings and walls is disclosed, consisting of a hollow body which is closed by means of modules made from pressed rockwool, wherein the cables which are drawn through are arranged between the modules.

SUMMARY

This section provides a general summary of the disclosure, and is not a comprehensive disclosure of its full scope or all of its features.

The object of the invention is to provide an improved cable wall passthrough and a kit that enable flexible adaptation to different application situations. In particular, an adaptability to different installation situations is to be created.

To achieve this, a cable wall passthrough is provided according to the independent claim 1. Furthermore, a kit for a wall passthrough of cables according to the independent claim 13 is provided. Embodiments are the subject of dependent claims.

According to one aspect, a cable wall passthrough is provided having a housing component. The housing component can be mounted on a housing wall in the region of a wall opening and has a recess for passing cables through the housing component. The cable wall passthrough has webs that are integrally formed onto the housing component. With the webs, a plurality of openings separated by means of the webs are formed in the recess, wherein the openings are configured to receive one or more sealing elements, respectively, with which a cable bushing for at least one of the cables is produced. The cable wall passthrough has a closure component which closes at least one of the openings and is arranged on the housing component and/or the webs via one or more predetermined breaking points.

According to a further aspect, a kit for a wall passthrough of cables is provided, which has a cable wall passthrough and one or more grid components. The grid components are configured to be arranged in an opening of a recess of a housing component of the cable wall passthrough in order to form separate receptacles for sealing elements in the associated opening. Furthermore, one or more sealing elements are provided with which a cable bushing for at least one of the cables can be produced.

Depending on the installation situation for the cable wall passthrough, the openings arranged in the recess, of which at least one part is initially covered by a respective closure component, can be removed by separating the respective closure component in that the respective closure component is released from the housing component and/or the webs by separating the one or more predetermined breaking points. In this way, one or more originally closed openings can be uncovered to form application-dependent cable passthroughs, in particular by arranging one or more sealing elements therein, which in turn sealingly guide one or more cables through the housing wall.

The closure component, which can be designed as a flange plate in an alternative embodiment, can be arranged in this or other embodiments on the outside or inside of the housing wall in the region of the wall opening. An inside mounting can be provided, for example, in forming the cable wall passthrough in the floor region.

The openings in the closure component can be round or square openings, wherein a closure component can be provided, which has both at least one round and at least one angular opening, which are initially closed.

The openings formed by the webs provide receptacles for the sealing elements into which the sealing elements can be introduced to pass through the cables sealingly.

In one embodiment, the housing component and the webs can be formed as an outer and an inner frame.

The openings formed separately by means of the webs in the recess of the housing component can have a round or an angular cross-section with respect to the opening area. The same applies to the closure components that cover the respective opening.

The closure component associated with an opening can seal it in a fluid-tight manner. Alternatively, a gap between the edge of the closure component and an opposite edge of the opening can be at least arranged in sections. Assigned predetermined breaking points can be formed on the inside in this or other embodiments, that is, on a rear-side of the closure component, which faces the housing during the mounting of the housing component on the housing wall.

With the aid of the cable wall passthrough, in one embodiment, an arrangement having a wall passthrough for a plurality of cables can be provided, which arrangement has a wall having a wall opening through which several cables are passed through. The wall can be made of different materials, such as plastic or metal. In one embodiment, it can be a wall of sheet metal. The wall passthrough comprises the housing component, which is arranged on one side on the housing wall, such that the recess formed on the housing component is arranged opposite the wall opening. Several cables each run through the wall opening and the recess and an associated sealing element. The respective associated sealing elements are arranged circumferentially sealing the respective cable in the recess of the housing component. In the recess of the housing component of the cable wall passthrough, separate receptacles for one or more sealing elements are formed with the aid of one or more grid components, in which the sealing elements that receive and seal the cable are arranged. The grid component(s) are inserted through the wall opening in the recess of the housing component and there in the region of the housing opening, after arranging the housing component on the wall from an opposite side of the wall, which can be, for example, an inner side.

The cable wall or wall duct, in particular with regard to the cable seal, can comply with degree of protection IP65 according to EN60529. Regardless of meeting this standard, the seal in the various embodiments can be at least designed to provide moisture and dirt protection.

The closure component can be formed in several pieces having a plurality of partial closure components, which are connected via assigned predetermined breaking points and each close a respective partial region of the at least one openings. In this embodiment, the opening associated with a closure component can be laid open only partially or piece by piece by removing one or more partial closure components by means of separation.

The closure component can be provided as a closure plate. In this or other embodiments, the housing component and the closure components can be designed as an injection-molded component, whether it be by means of one or two component injection molding.

The plurality of predetermined breaking points can be arranged distributed along a circumferential edge of the closure component. The plurality of predetermined breaking points can be formed by means of equidistantly spaced connections along the circumferential edge of the closure component. Regardless of the selected distance between adjacent connections of the predetermined breaking points, these can be formed as injection-molded connections in the various embodiments.

The housing component can be formed with a flange plate which is formed around the recess. The flange plate can have bores which are used for receiving fasteners when mounting the housing component on the housing wall.

The webs can have an edge web which is formed circumferentially around the recess. The edge web can be circumferentially formed continuously or interrupted. The edge web can run along the peripheral edge of the recess on the housing component.

The webs can have intermediate webs, which are arranged to form the openings within the recess. The intermediate webs can be formed equal to the edge web with respect to a web height and/or a web wall thickness. Alternatively, the intermediate webs can differ from the edge web with respect to the web height and/or the web wall thickness.

At least part of the webs can be formed protruding from a housing mounting surface of the housing component. With the housing mounting surface, the housing component can bear on the outside or inside of the housing in which the housing wall opening is formed when mounting. The edge web can be inserted into the housing wall opening. Optionally, the edge web can protrude out or over towards the interior/exterior on the inside/outside of the housing wall. The edge web and the intermediate webs can protrude from the housing mounting surface of the housing component with the same height. Alternatively, it can be provided that the projection is designed with different heights for the edge web on the one hand and the intermediate webs on the other hand. The edge web and/or the intermediate webs can be designed to not protrude out or over on the opposite side of the housing component, that is, the side of the housing component facing away from the housing.

The webs can have mounting receptacles which are configured to receive one or more grid components for mounting in an associated opening to form separate receptacles for sealing elements in the associated opening. The one or more grid components can be releasably arranged on the webs by means of the mounting receptacles.

A plurality of grid components can be arranged in an opening, in which mutually associated surface sections of adjacent grid components sealingly bear on one another. Alternatively, only a single grid component can be arranged in an opening in order to produce at least two receptacles for sealing elements. The plurality of grid components can be formed with the same height as the surrounding webs. Mounting receptacles can be provided at the mutually associated surface sections of the adjacent grid components, which mounting receptacles are formed equal to the mounting receptacles on the webs. In this way, sealing connections can be formed between the mutually associated surface sections of the adjacent grid components, comparable to the sealing connections between the webs and the grid components.

For the plurality of grid components, an end face of a partial web of one of the grid components can be sealingly arranged on a side surface of a partial web, in particular on a longitudinal side of the partial web, of an adjacent grid component. For example, the partial webs can run horizontally and vertically.

The grid components can have crossed and/or non-crossed grid components. In the case of crossed grid components, grid component webs can run transversely to each other, for example, at right angles.

A method for producing a wall passthrough for a plurality of cables can be carried out, the method having the following steps: providing a wall having a wall opening; arranging a housing or a housing component of a cable wall or wall passthrough on one side on the wall, such that a housing opening formed on the housing, which housing opening forms a recess, is arranged opposite the wall opening; arranging at least one grid component in a receiving space (recess) of the housing, wherein the at least one grid component is introduced, after arranging the housing or housing component on the wall, from an opposite side of the wall through the wall opening in the receiving space and there in the region of the housing opening and herein provides separate receptacles for one or more sealing components, respectively; and arranging a plurality of sealing elements in the separate receptacles, wherein a plurality of cables are provided, each running through the wall opening and the housing opening as well as an associated sealing element, which is arranged in the associated receptacle, circumferentially sealing the respective cable.

An attachment of the housing or housing component on the wall having the wall opening can be done, for example, by means of one or more screws. Alternatively or additionally, for example, a latching can be provided for attachment.

The grid or grating component can be attached in the receiving space of the housing or housing component, for example, by means of clamps and/or notches.

The sealing elements can be formed with one or more cable bushings.

They can be made of an elastic material which yields elastically under pressure, for example a rubber material. The sealing elements can be designed in one or more parts. In the case of a one-piece design, a slot or cut extending from the outer edge to a cable passthrough can be provided, which enables an opening of the sealing element, for example, for inserting a cable from the side along the slot. The sealing elements can be formed at least in part as a hollow body having an inner and/or an outer cavity or as a full material body.

The housing or housing component of the wall passthrough can be designed in one part or in several parts.

The grid component can be designed as a component with a grate (grating component), which is formed by means of webs which partially or completely surround the respective receptacles. A part of the webs can be formed discontinuously.

Exactly one sealing element can be arranged in at least a part of the separate receptacles. Likewise, an opening can serve for receiving only one sealing element. Only exactly one sealing element can be arranged in each of the receptacles. The respective sealing element can sealingly receive one or more cables. In one embodiment, exactly one sealing element is arranged in each receptacle, which sealing element receives exactly one cable.

A plurality of sealing elements can be arranged in at least part of the separate receptacles which are formed in the openings. The plurality of sealing elements can completely fill the receptacle in which they are arranged together.

When inserted into the receptacle, the sealing elements can be designed to automatically clamp and circumferentially seal the cable. In this case, the sealing elements can be pressurized, at least in an assembly position, in which they are substantially completely arranged in the associated receptacle, be it by the grid component and/or the housing of the wall passthrough. In this or other embodiments, the circumferential sealing of the cable can be formed on the sealing element with the aid of a sealing lip which is arranged discontinuously or continuously in the assembled state on the outer surface of the cable. Several circumferential sealing lips can be provided. By means of the plurality of sealing lips, that is, at least two sealing lips, a frictional resistance opposing the cable when pulling through can be determined depending on the application. For example, at least three or at least five sealing lips can be provided to achieve a desired pull-through resistance.

The automatic clamping and sealing action can increase the further the sealing element is inserted into the receptacle. The automatic clamping and sealing action can be formed continuously increasing along a push-in section towards the mounting position.

The sealing elements can be releasably received in the receptacles. The releasable receiving can be designed, for example, so that the sealing elements are stuck or inserted into the associated receptacle. The releasable receptacle can enable repeated mounting and dismounting of the sealing elements in the receptacles.

The sealing elements and/or the receptacles can be designed conical. For example, the sealing elements and/or the receptacles can have a truncated cone shape. In connection with the grid component, it can be provided that webs surrounding the receptacles are formed conical in cross-section. The inclination relative to the respective center line of the conical profile can be different for the sealing elements on the one hand and the receptacles on the other hand.

An outer surface of the sealing elements and/or an inner surface of the receptacles can have a surface structuring. The surface structuring can be designed to increase the friction between the outer surface of the sealing element and the inner surface of the receptacle. Complementary surface structuring can be provided on surface sections of the outer surface of the sealing element and the inner surface of the receptacle opposite to one another in the mounting position of the sealing elements.

The sealing elements can have an edge-side sealing lip on a proximal and/or on a distal end face, which are arranged at least in sections on an end face of the grid component. The edge-side sealing lip thereby overlaps at least in sections with an end face of the grid component. In an embodiment, in which the cover is provided on the opposite side of the wall, the cover can press the edge-side sealing lip against the end face, whereby an additional sealing effect can be deployed.

The end face of the grid component can be formed exposed at least in sections. The end face of the grid component can thus be viewed, when the wall passthrough is mounted, from one or both sides of the wall, in which the wall opening is formed.

The grid component can be releasably arranged in the housing or housing component. A releasable connection can be designed, for example, as a latching connection or clamping connection. As an alternative to the releasable connection, a non-releasable connection of the grid component after its insertion into the housing can be provided, that is, in particular a connection which can only be separated again by means of partial destruction of the components involved.

An edge surrounding the housing opening can at least partially bear on the end face of edge-side sealing elements. For example, an inwardly extending or projecting edge of the housing can bear on the end face of edge-side sealing elements, which are arranged in the housing of the wall passthrough.

The grid component can be designed in one piece. Alternatively, the grid component can be designed in several parts, for example, having a plurality of grating components, which can be individually inserted into the receiving space of the housing to be selectively connected to each other there, for example, by means of a latch or a plug connection. Alternatively, it can be provided that the plurality of grid components is not connected to each other, but rather are mounted only by means of respective connection to the housing of the wall passthrough in its receiving space. This does not exclude, in particular, that surfaces of the plurality of grid components are supported on one another or come to bear on one another.

A cover can be arranged on the opposite side of the wall. With the cover, for example, a cover plate, which is designed in one or more parts, additional pressure can be exerted on the sealing elements to generate an additional sealing action. The cover, for example, on the side of the wall facing the interior, covers the wall opening partially or completely, wherein the cables run through one or more openings in the cover plate. The cover plate can be attached by means of one or more screws.

In the grid or grating component, sealing sections can be provided in distal corner regions of the webs, catching the webs on one or two sides, with which sealing sections seals are formed between the housing and the grid component when the grid component is mounted in the receiving space of the housing. The sealing sections can be integrally formed on the grid component. The sealing sections can be made of a softer plastic material compared to the webs. The grid component can be produced by means of two-component injection molding. When inserting the grid component into the housing, the distal corner regions can precede, and the sealing sections can finally bear sealingly on the inside of the housing when the grid or grating component is attached in the housing by means of latching elements, which can be arranged adjacent to proximal corner regions on a web outside. In this case, the sealing sections can be pressed inside against the housing or housing component with one or both sealing partial sections of the sealing section, at least in a latched position. The two sealing partial sections can be connected via a corner. One or more sealing lips can be arranged on the sealing partial section. Alternatively, only one sealing lip can be provided. The further sealing partial section can additionally have one or more sealing lips or be free thereof.

The sealing lips can be arranged in alignment with further sealing lips on the sealing elements when the sealing elements sit in the receptacles. A form-fitting connection can be provided here. The sealing lips and the further sealing lips can be designed with the same height. Alternatively or additionally, the sealing lips can have the same cross-section as further sealing lips. In the region of a front end face of the webs, connections can be provided to run between the sealing sections in the corner regions, which can alternatively be absent. The connections, which can be designed narrower than the sealing sections, can at least partially extend in depressions in the webs, which depressions are formed with channels. Such a design can alternatively or additionally be provided for the sealing sections. Lateral sections of the sealing sections can be connected to the sealing elements in a form-fitting manner. A surface of the further sealing partial sections can lie in a plane with a surface of the sealing elements. Collar sections can be formed laterally on one or both sides on the further sealing partial section.

The embodiments described above can be provided accordingly in conjunction with the kit for the wall duct and the method for production.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the following, further embodiments are explained in more detail with reference to figures of a drawing. Herein show:

DETAILED DESCRIPTION

Example embodiments will now be described more fully with reference to the accompanying drawings.

In the following, with reference to FIGS. 1 to 7, embodiments for a cable wall passthrough or wall passthrough 1 for the sealed passage of a plurality of cables 2 through a wall 3 are described, for which a wall section is shown. The wall 3 can be, for example, a housing wall of a device or a control cabinet. The wall 3 can, for example, be made of a sheet metal material.

Figure 1:
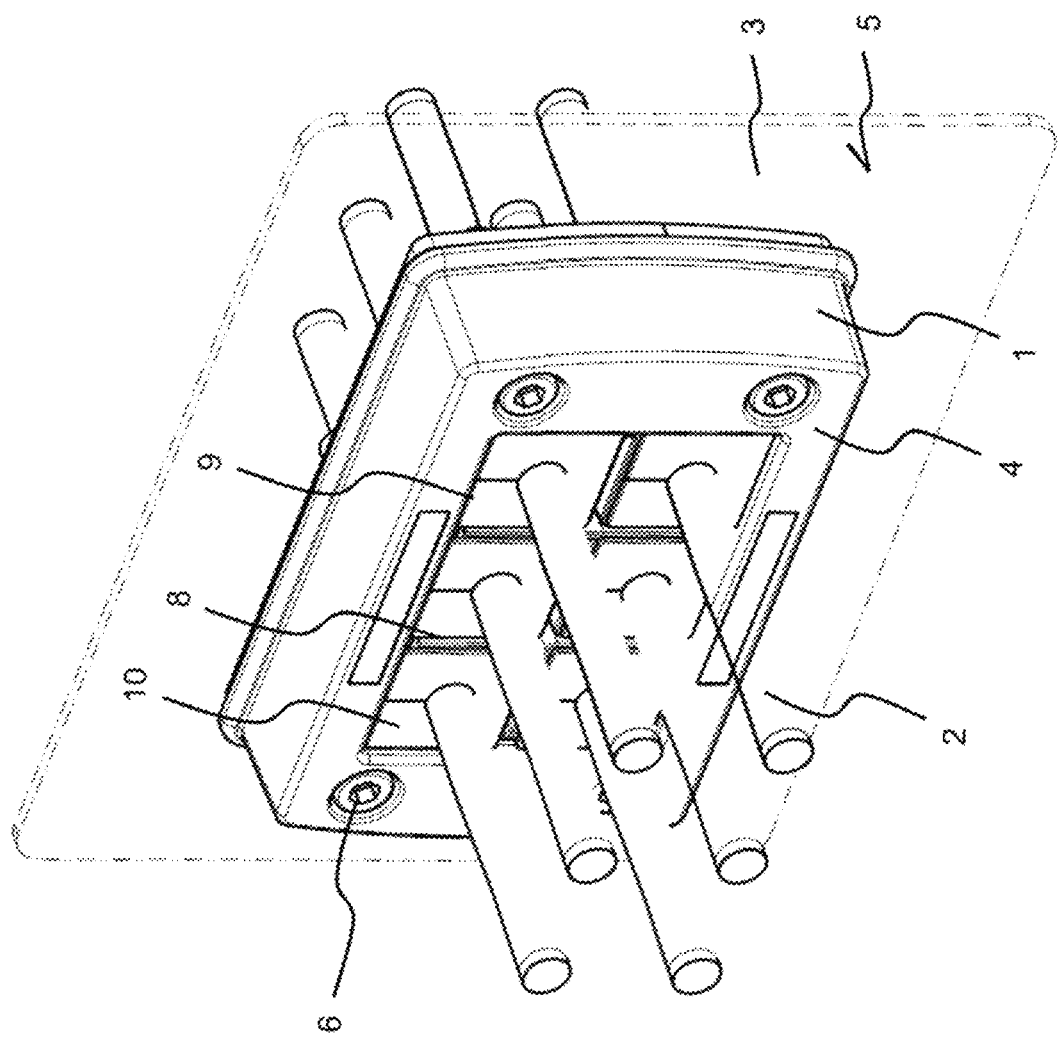
FIG. 1 shows a schematic representation of an arrangement having a wall section and a wall passthrough for a plurality of cables.

FIG. 1 shows a perspective representation of an arrangement having the cable wall passthrough 1, which has a housing or housing component 4, which is produced in one piece of a plastic material in the illustrated embodiment, for example, as an injection-molded component. The housing component 4 is attached on one side 5 of the wall 3, for example, by means of screws 6. The housing component 4 is placed on the wall 3 and provides a receiving space 7 in the interior (see, in particular, FIGS. 4 and 7 below). A grid component 8 is arranged in the receiving space 7. In the embodiment shown, the grid component 8 provides a plurality of receptacles 9, in each of which a sealing element 10 is arranged with one of the plurality of cables 2. The sealing element 10 seals the respective cable circumferentially, in particular, against ingress of moisture and dirt.

Figure 2:
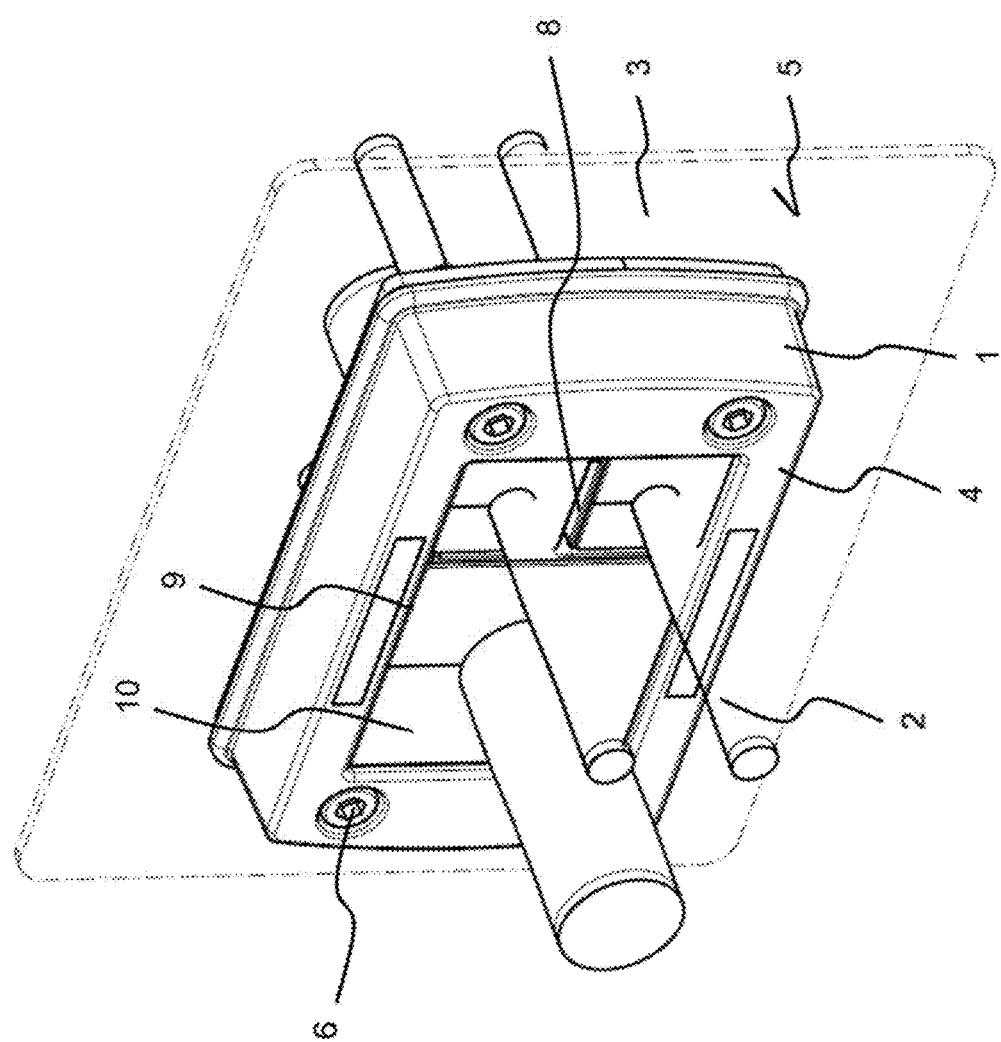
FIG. 2 shows a schematic representation of a further arrangement having a wall section and a wall passthrough for a plurality of cables.

FIG. 2 shows a perspective representation of a further arrangement having the cable wall passthrough 1 in another embodiment. The grid component 8 provides another distribution or division of the receptacles 9 in the receiving space 7 of the housing component 4.

Figure 3:
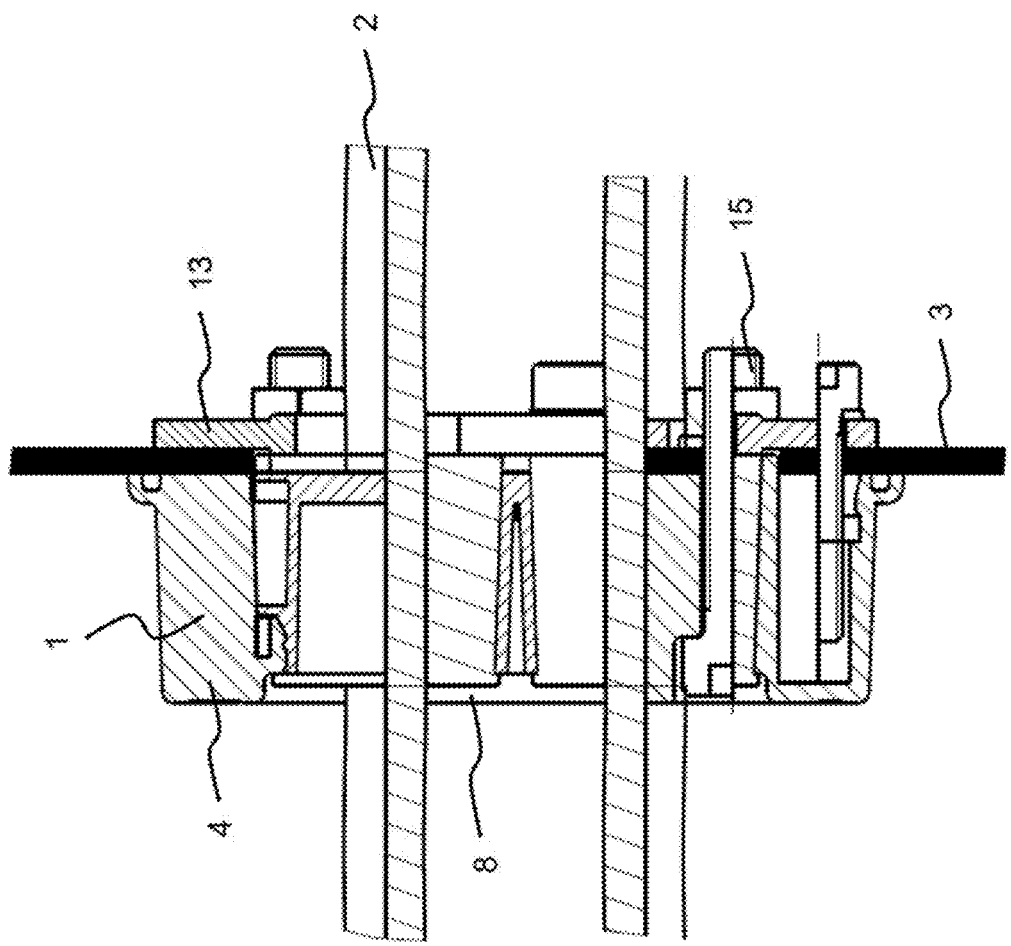
FIG. 3 shows a sectional representation of the arrangement of FIG. 1.

FIG. 3 shows a sectional representation through the arrangement in FIG. 1.

Figure 4:
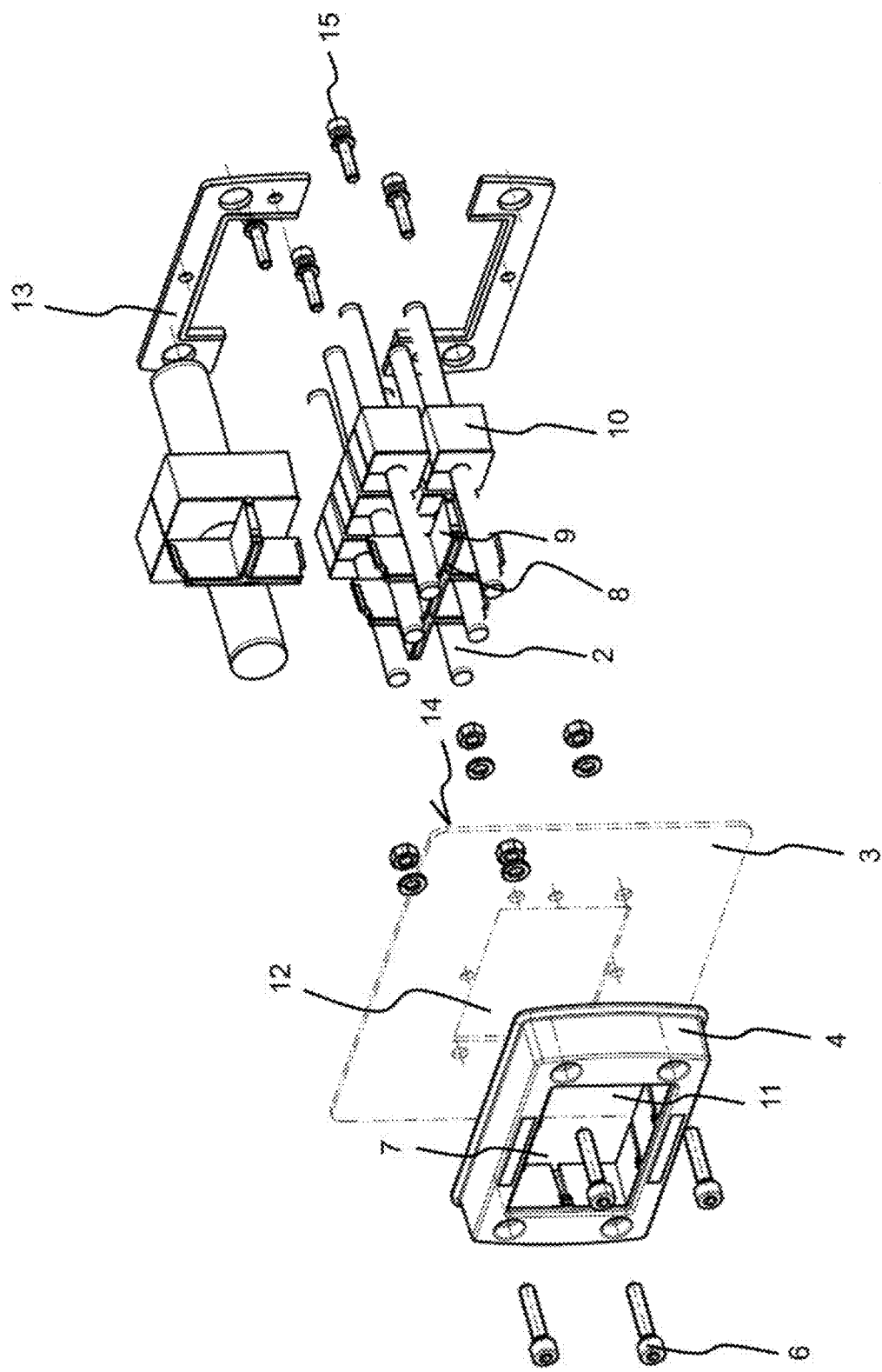
FIG. 4 shows a schematic representation of components of the arrangement of FIG. 1.

FIG. 4 shows an exploded representation of the arrangement having the wall passthrough 1 in the embodiment according to FIG. 1.

In particular, FIG. 4 shows that the grid component 8 in the receiving space 7 of the housing component 4 can be inserted after the housing component 4 is attached on the side 5 of the wall 3 by means of screws 6. With the help of the attachment of the housing component 4, a housing opening 11 is arranged opposite a wall opening 12, so that the two openings at least partially overlap in a planar manner. The grid component 8 can then be inserted through the wall opening 12 into the receiving space 7 to there provide the receptacles 9, in which the sealing elements 10 are then inserted with the respective cable. In the embodiment shown, a cover 13 is provided on an opposite side 14 of the wall 3, which cover is also fastened to the wall 3 by means of screws 15.

In the cable wall passthrough 1, it is thus possible in the process of mounting, first to mount the housing 4 on the side 5 of the wall 3, in order to then pass equipped cable ends of the plurality of cables 2 through the still large-area opening of the wall opening 12 and the housing opening 11. Subsequently, the grid component 8 can be mounted through the wall opening 12 in the receiving space 7, in order to finally insert the sealing elements 10 in the receptacles 9.

Figure 6:
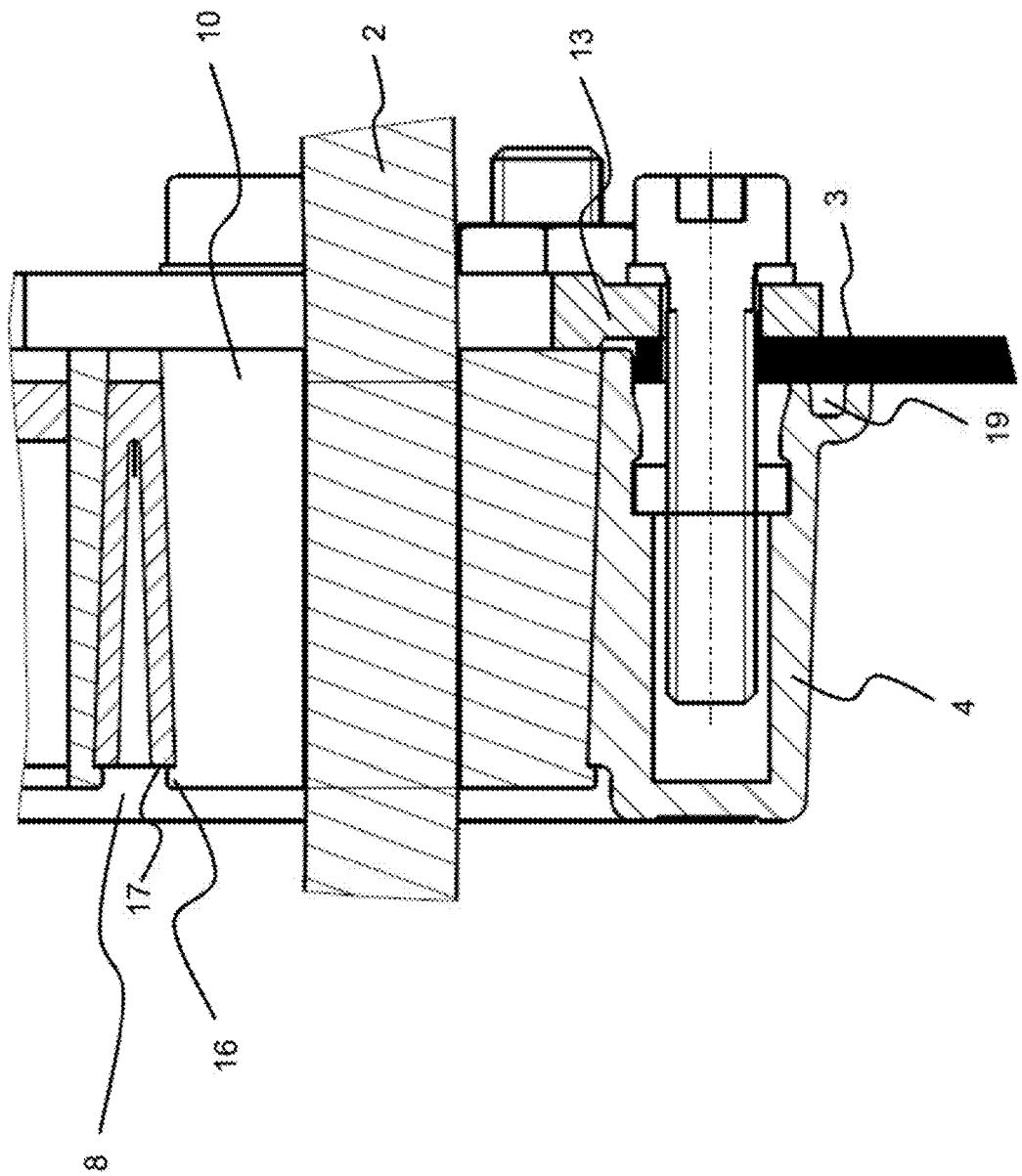
FIG. 6 shows a schematic sectional representation of a further section of the wall passthrough for a plurality of cables.

In the embodiment, the sealing elements 10 are shown automatically clamping in the receptacles 9 when the sealing elements 10 are inserted therein. For this purpose, the receptacles 9 are designed conical, which is seen in particular from FIG. 6. Alternatively or additionally, the sealing elements 10 can have a conical outer shape. FIG. 6 further shows that an edge-side sealing lip 16 is formed on the sealing elements 10, which sealing lip bears on an end face 17 of the grid component 8.

Figure 5:
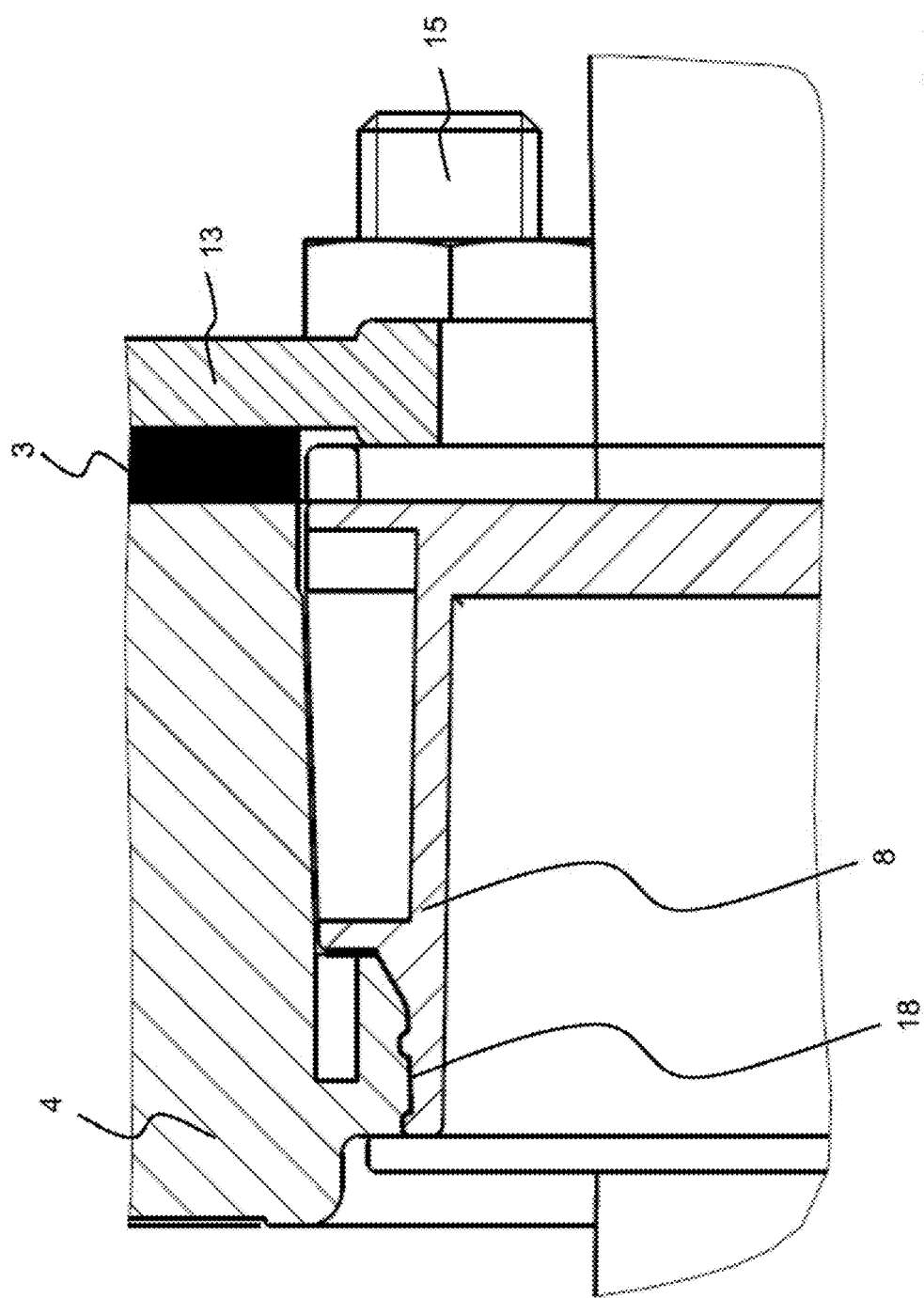
FIG. 5 shows a schematic sectional representation of a section of the arrangement having the wall passthrough.

FIG. 5 shows a schematic cross-sectional representation of a section of the arrangement having the cable wall passthrough 1. In particular, it follows that the grid component 8, which is designed as an insert frame in the embodiment shown, is mounted on the housing component 4 by means of a latching connection 18.

Figure 7:
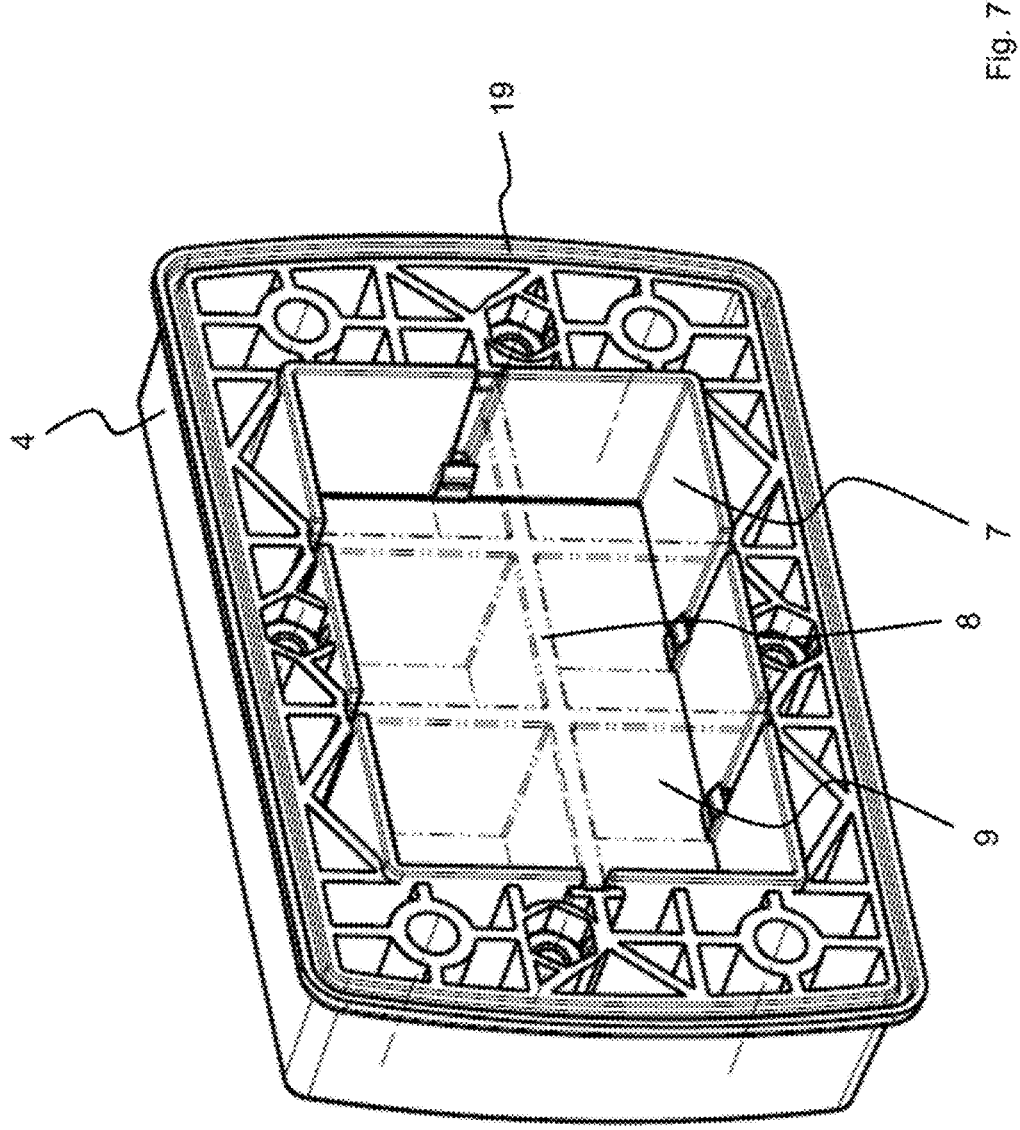
FIG. 7 shows a perspective representation having a housing and grid component for a wall passthrough received therein.

FIG. 7 shows a perspective representation in which the grid component 8 is inserted into the housing component 4. A sealing lip 19 is provided circumferentially on the housing part 4.

Figure 8:
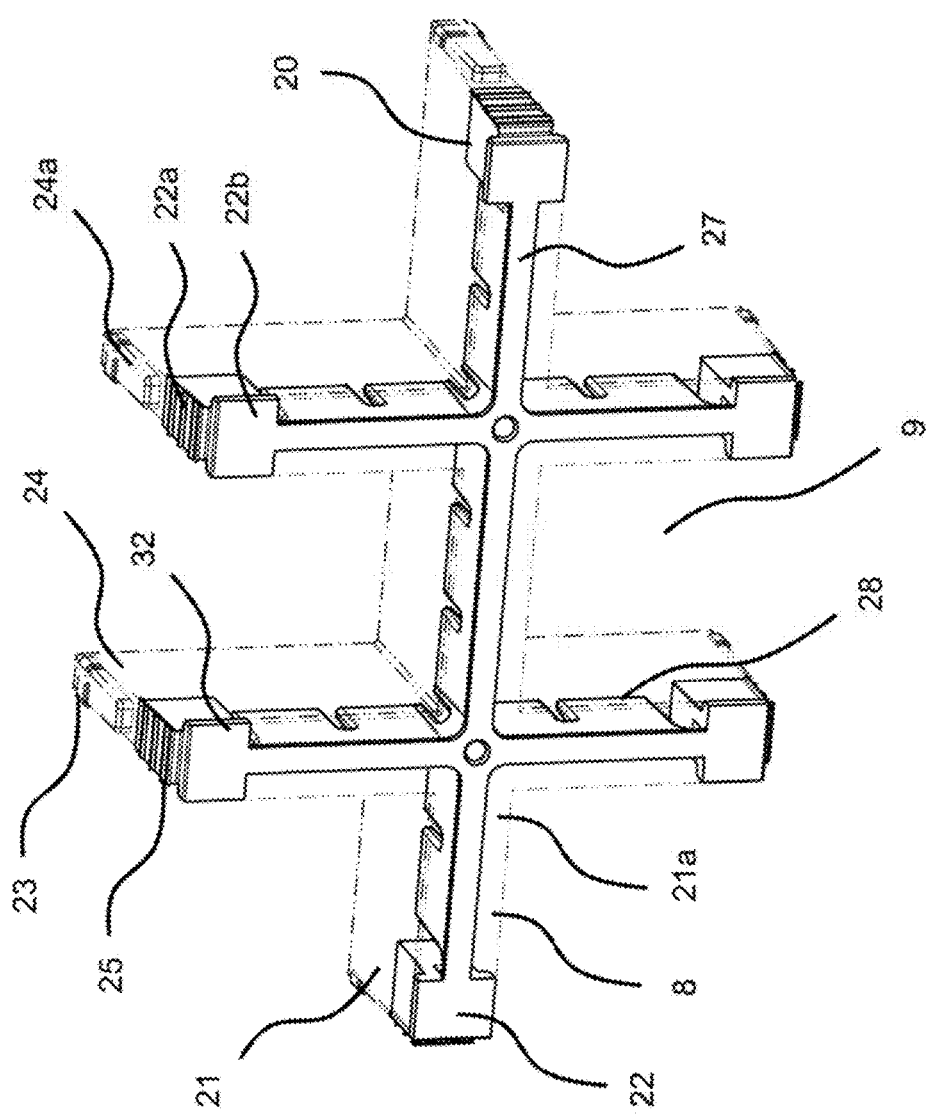
FIG. 8 shows a schematic perspective representation of a grid component, on which sealing sections are formed.
Figure 9:
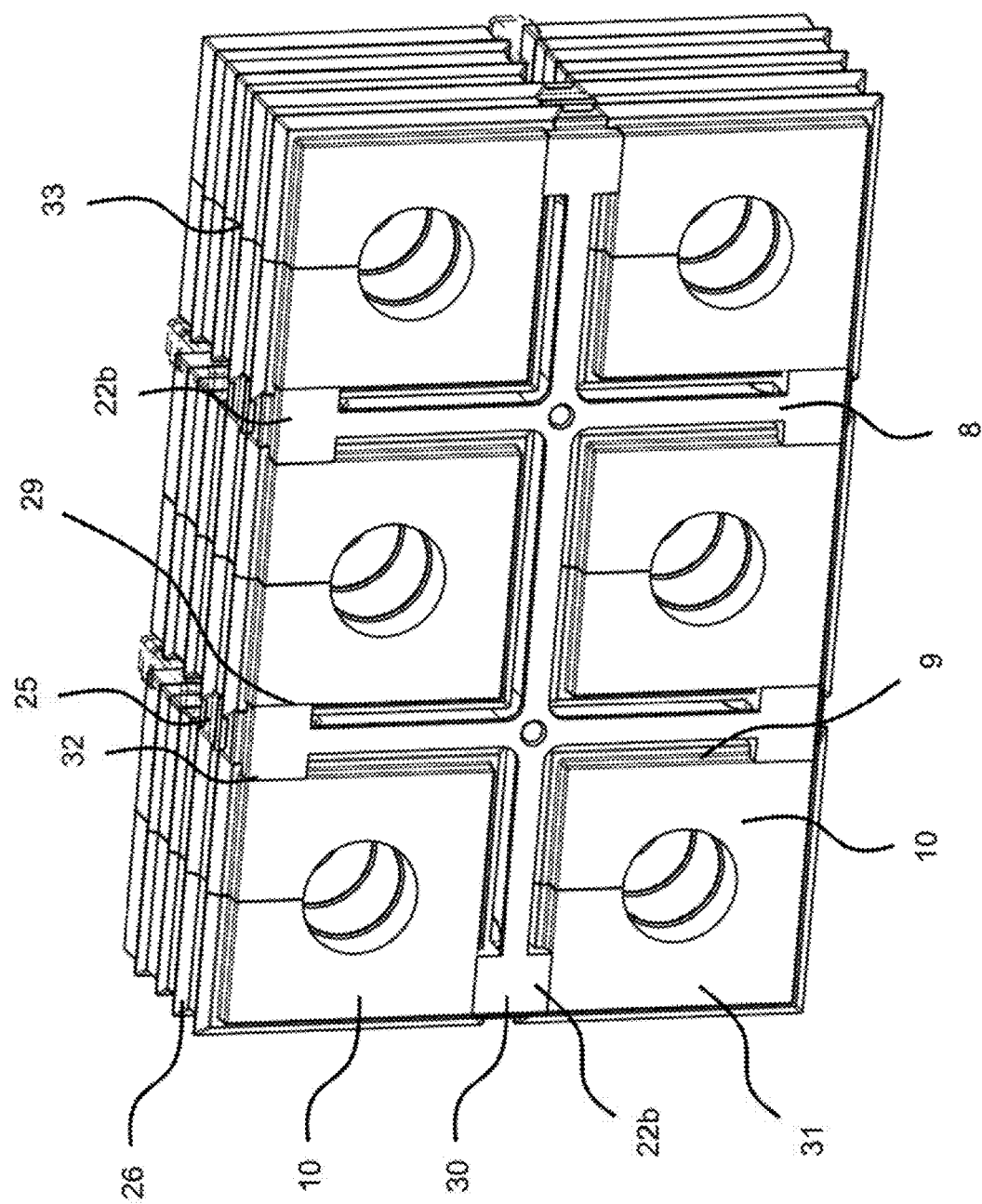
FIG. 9 shows a schematic perspective representation of the grid component of FIG. 8, wherein sealing elements are arranged in receptacles.

FIGS. 8 and 9 show schematic perspective representations of a further embodiment for the grid component 8. The sealing elements 10 are arranged in the receptacles 9 in FIG. 9.

Sealing sections 22 are formed in distal corner regions 20 of webs 21 of the grid component 8. The sealing sections 22 are made of a softer plastic material in comparison to the webs 21, for example, a plastic material elastically yielding to pressure load. The grid component 8 can be produced by means of 2-component injection molding.

When inserting the grid component into the housing component 4, the distal corner regions 20 advance and the sealing sections 22 finally completely or partially bear sealingly inside on the housing component 4 when the grid or grating component 8 can be attached in the housing 4 and/or on the wall opening by means of latching elements 23 which are arranged adjacent to proximal corner regions 24 on a web outside 24a. Herein, the sealing sections 22 can be pressed against the housing component 4 at least in an inserted position with one or both sealing partial sections 22a, 22b of the sealing section 22. Sealing lips 25 are arranged on the sealing partial section 22a. Alternatively, only one sealing lip can be provided. The further sealing partial section 22b, which can also be dispensed with in an alternative embodiment, can additionally have one or more sealing lips (not shown) or be free thereof (see FIG. 8).

According to the representation in FIG. 9, the sealing lips 25 can be arranged in alignment with further sealing lips 26 on the sealing elements 10 when the sealing elements 10 are seated in the receptacles 9. A form-fitting connection can be provided here. The sealing lips 25 and the further sealing lips 26 can be designed with the same height. Alternatively or additionally, the sealing lips 25 and the further sealing lips 26 can have the same cross-section.

It can be provided, as shown by way of example in FIGS. 8 and 9, that in the region of a front end face 21a of the webs 21, connections 27 run between the sealing sections 22 in the distal corner regions 20, which can alternatively be omitted. In the embodiment shown, the connections 27 extend in depressions 28 in the webs 21, which can be formed with channels, such that the material from which the connections 27 are made can pass from the front end face 21a into the depressions 28.

According to FIG. 9, in the embodiment shown, lateral sections 29 of the sealing sections 22 form-fittingly connect to the sealing elements 10. A surface 30 of the further sealing partial section 22b can lie in a plane with a surface 31 of the sealing elements 10, which FIG. 9 shows. Lateral collar sections 32 are formed on the further sealing section 22b.

The sealing elements 10 have a cut 33, which enables the opening, widening or spreading of the sealing elements 10, for example, when inserting a cable.

Figure 10:
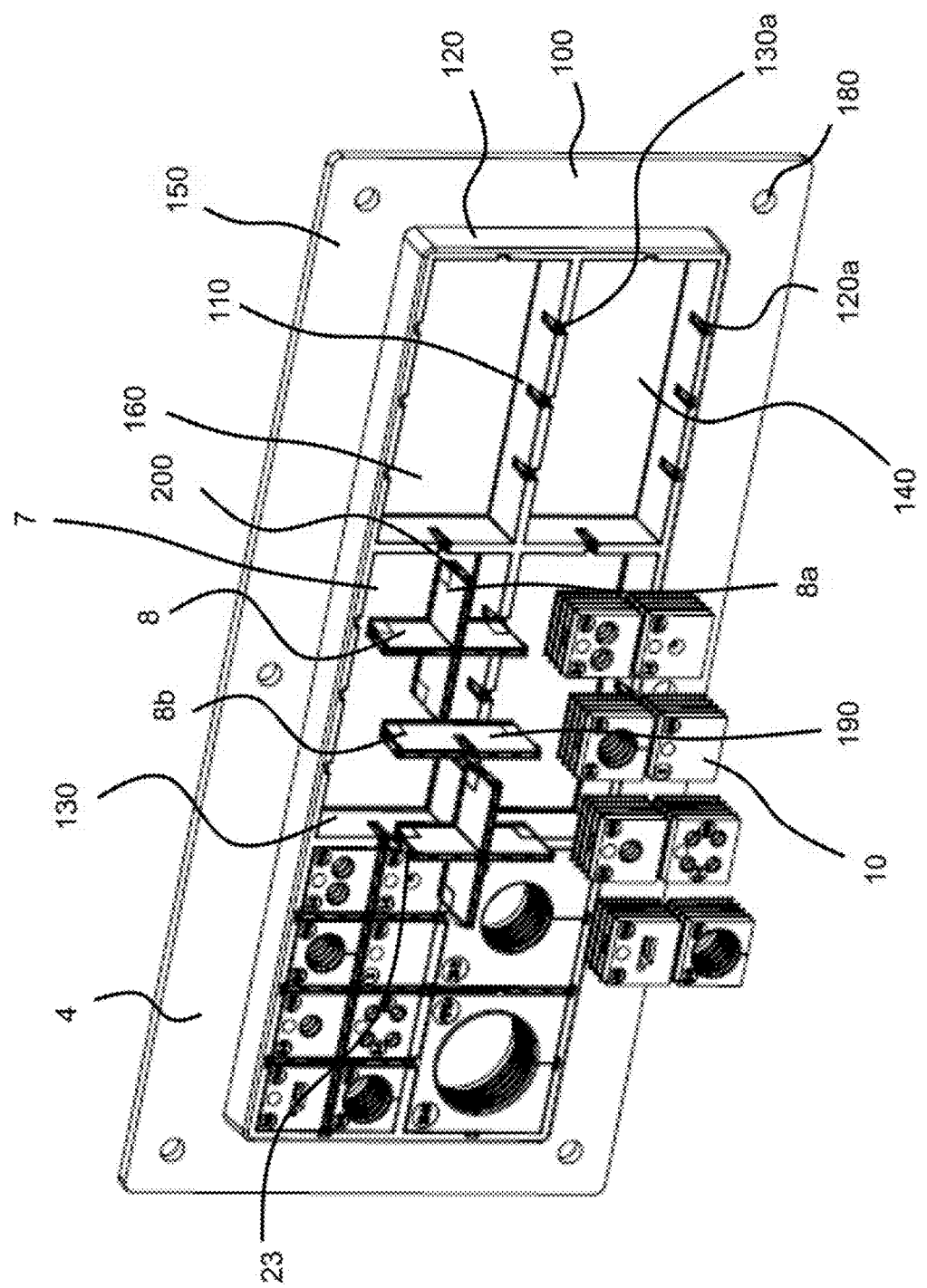
FIG. 10 shows a schematic representation of an arrangement having a cable wall passthrough for a plurality of cables.
Figure 11:
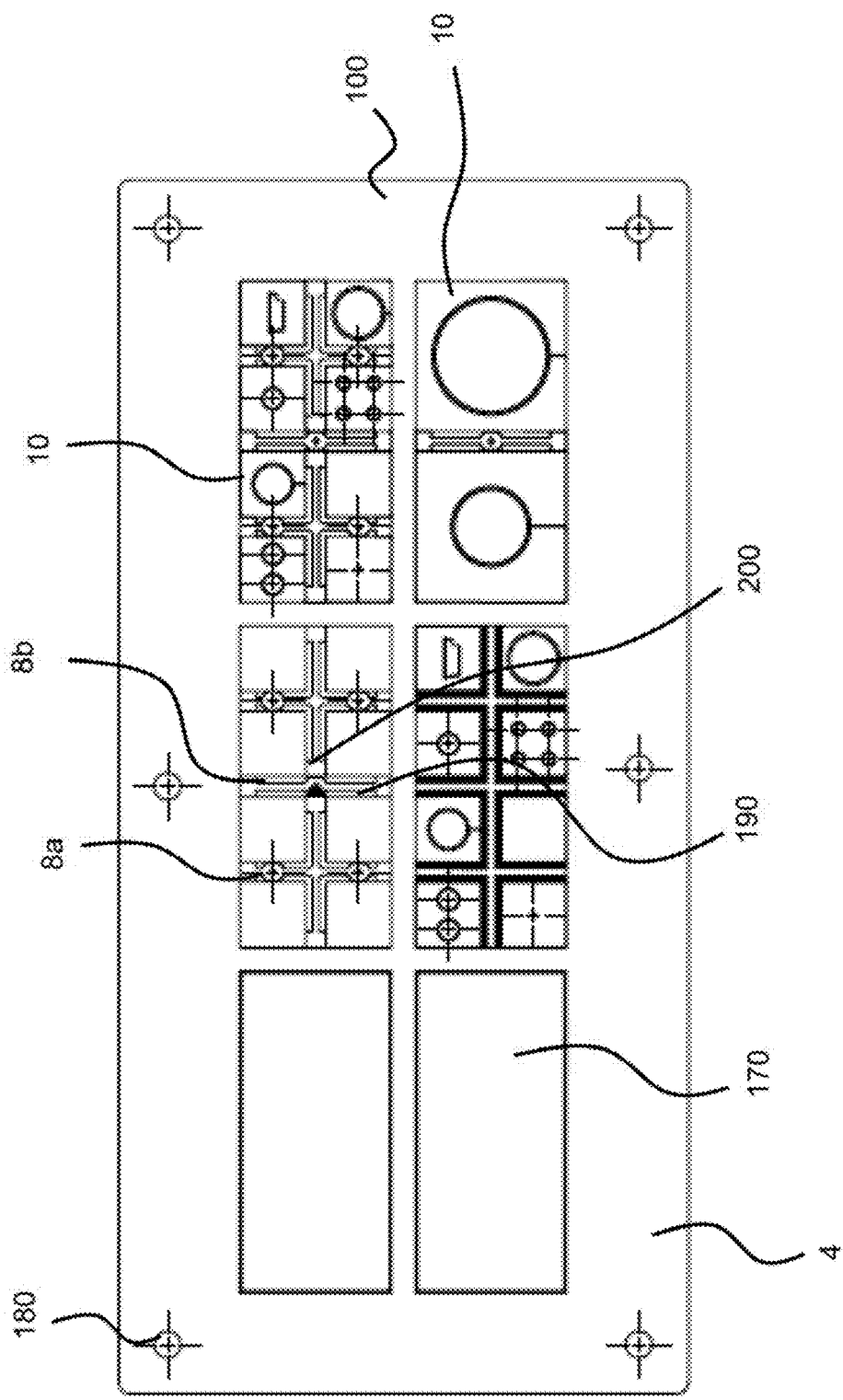
FIG. 11 shows a schematic representation of the arrangement of FIG. 10 from the front.
Figure 12:
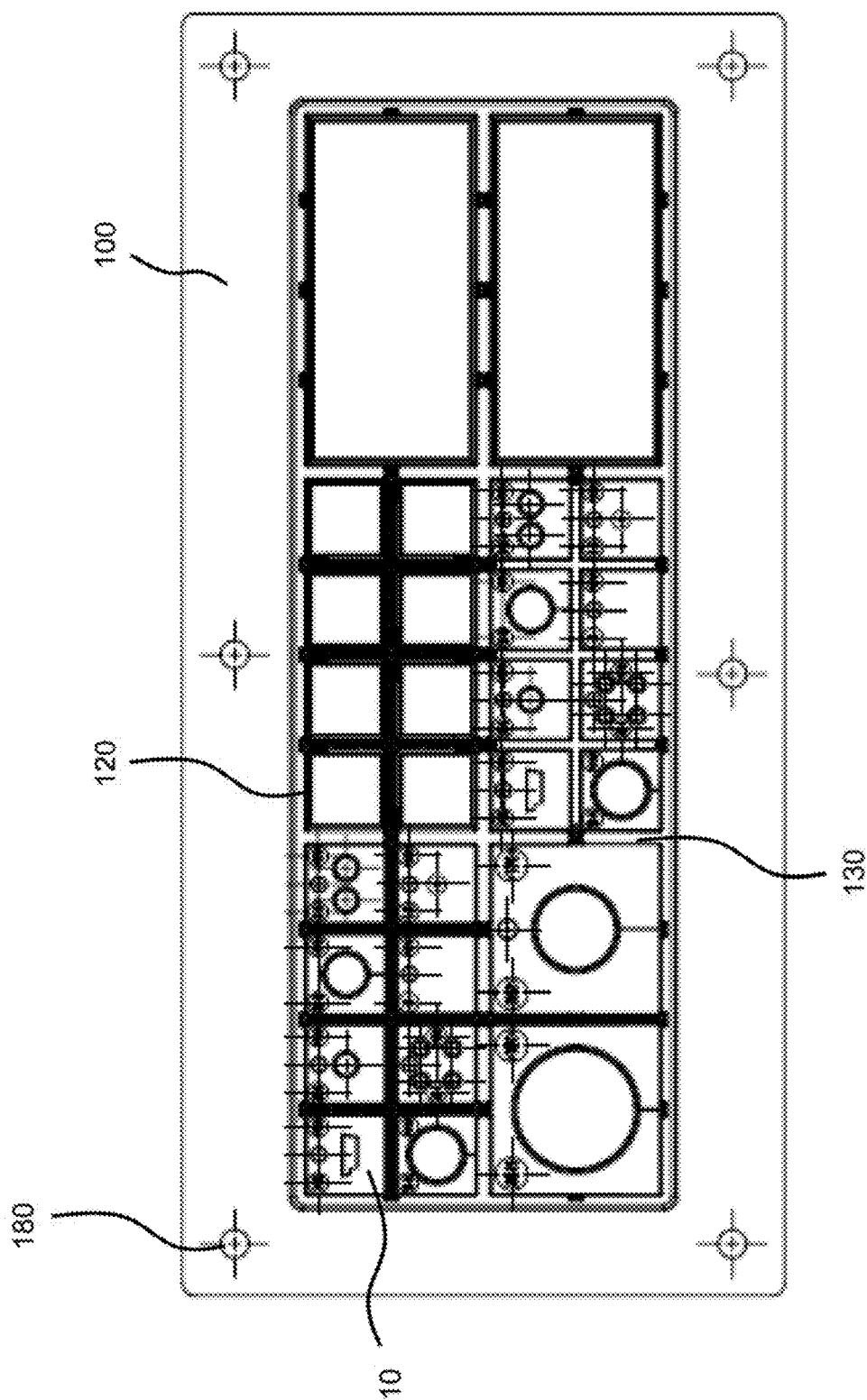
FIG. 12 shows a schematic representation of the arrangement of FIG. 10 from behind.

FIGS. 10 to 12 show schematic representations of an arrangement having a further cable wall passthrough. The same reference numerals are used for the same features in FIGS. 10 to 12 as in the preceding figures. FIG. 11 shows the arrangement from FIG. 10 from the front, that is, from a side facing away from the housing after a housing installation, whereas FIG. 12 shows the arrangement from the rear.

The housing or housing component 4 is designed with a flange plate 100, on which webs 110 are arranged on the back-side, which webs 110 comprise an edge web 120 and intermediate webs 130. The edge web 120 runs around a recess 140, with which the receiving space 7 is formed. The edge web 120 is formed, projecting, on a housing mounting surface 150 of the housing component 4. In the embodiment shown, the edge web 120 is designed circumferentially continuous.

A plurality of openings 160 are provided with the help of the intermediate webs 130, a part of which is covered with a closure component 170, which is arranged, via predetermined breaking points, on the intermediate webs 130 and the housing component 4, such that the closure component 170 can be removed during the formation of a wall passthrough for cables so as to uncover the associated opening, so that grid components 8 and sealing elements 10 can be introduced herein.

In the embodiment shown, the edge web 120 and the intermediate webs 130 have the same web height and the same web wall thickness.

The flange plate 100 has bores 180 which are used for receiving fasteners (not shown) when mounting on the housing wall, for example, screws or rivets.

According to the representation in FIG. 11, the grid components 8 have crossed and non-crossed grid components 8a, 8b, for which the explanations on alternative embodiments listed above in connection with the grid components 8 apply correspondingly. Receptacles 120a, 130a on the edge web 120 and the intermediate webs 130 cooperate with the latching elements 23 on the grid components, as was described above.

During installation, mutually associated surfaces 190, 200 of the crossed and non-crossed grid components 8a, 8b come to sealingly lie on one another, wherein the seal formed hereby is produced comparable to the formation of the sealing connection between the housing component 4 and the grid component 8.

The features disclosed in the foregoing description, the claims and the drawings can be important both individually and in any combination for the realization of the various embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A cable wall passthrough, having:
a housing component which can be mounted on a housing wall in the region of a wall opening and has a recess for passing cables through the housing component;
webs, which are integrally formed onto the housing component and with which a plurality of openings separated by means of the webs are formed in the recess, wherein the openings are configured to receive one or more sealing elements, respectively, with which a cable bushing for at least one of the cables is provided; and
a closure component which closes at least one of the openings and is arranged on the housing component and/or the webs via one or more predetermined breaking points, wherein the closure component can be released from the housing component or the webs by separating the one or more predetermined breaking points to uncover the at least one opening.

2. The cable wall passthrough according to claim 1, wherein the closure component is formed in several pieces having a plurality of partial closure components, which are connected via assigned predetermined breaking points and each close a respective partial region of the at least one openings.

3. The cable wall passthrough according to claim 1, wherein the closure component is provided as a closure plate.

4. The cable wall passthrough according to claim 1, wherein the plurality of predetermined breaking points are arranged distributed along a circumferential edge of the closure component.

5. The cable wall passthrough according to claim 1, wherein the housing component is formed with a flange plate which is formed around the recess.

6. The cable wall passthrough according to claim 1, wherein the webs have an edge web which is formed circumferentially around the recess.

7. The cable wall passthrough according to claim 1, wherein the webs have intermediate webs which are arranged to form the openings within the recess.

8. The cable wall passthrough according to claim 1, wherein at least a part of the webs are formed protruding from a housing mounting surface of the housing component.

9. The cable wall passthrough according to claim 1, wherein the webs have mounting receptacles which are configured to receive one or more grid components for mounting in an associated opening to form separate receptacles for sealing elements in the associated opening.

10. The cable wall passthrough according to claim 1, wherein a plurality of grid components are arranged in an opening, in which mutually associated surface sections of adjacent grid components sealingly bear on one another.

11. The cable wall passthrough according to claim 10, wherein, for the plurality of grid components, an end face of a partial web of one of the grid components is sealingly arranged on a side surface of a partial web of an adjacent grid component.

12. The cable wall passthrough according to claim 10, wherein the grid components have crossed and/or non-crossed grid components.

13. A kit for a wall passthrough of cables, having:
   a cable wall passthrough according to claim 1;
   one or more grid components which are configured to be arranged in an opening of a recess of a housing component of the cable wall passthrough in order to form separate receptacles for sealing elements in the associated opening; and
   one or more sealing elements (10) with which a cable bushing for at least one of the cables can be produced.

* * * * *